March 2, 1965 R. A. SALOMONE 3,171,708
ADAPTER FOR NEUTRAL TERMINAL BAR
Filed June 29, 1962
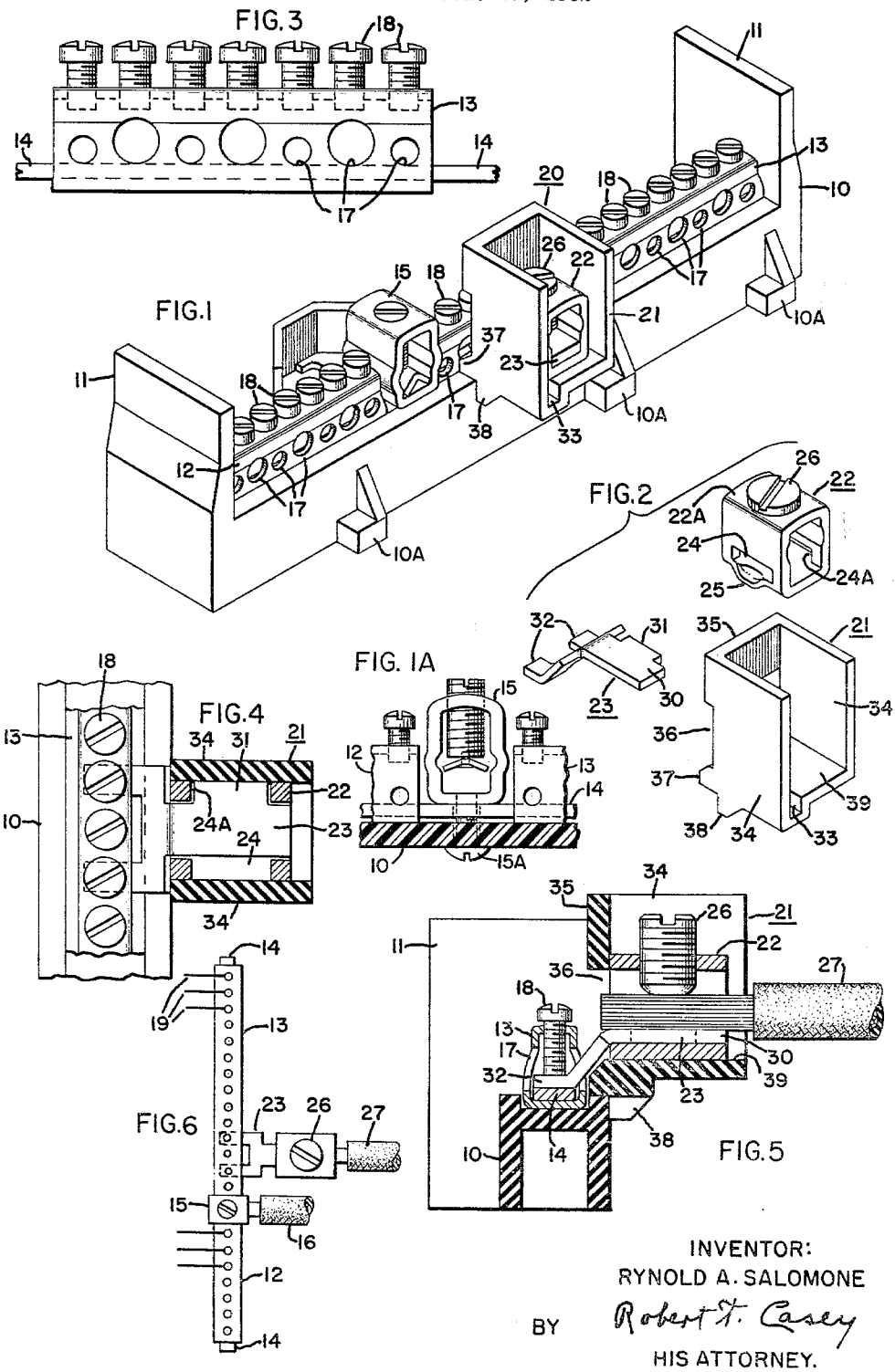
INVENTOR:
RYNOLD A. SALOMONE
BY Robert T. Casey
HIS ATTORNEY.

United States Patent Office 3,171,708
Patented Mar. 2, 1965

3,171,708
ADAPTER FOR NEUTRAL TERMINAL BAR
Rynold A. Salomone, Plainville, Conn., assignor to General Electric Company, a corporation of New York
Filed June 29, 1962, Ser. No. 206,405
2 Claims. (Cl. 339—198)

My invention relates to wire connectors, and more particularly to wire connectors suited for use with multiple wire connector assemblies.

Multiple wire connector assemblies are used in applications such as in electrical panel assemblies. Such panel assemblies commonly comprise a box or enclosure having means for receiving a relatively small number of incoming power lines, such as three or four, and means for connecting said incoming power lines to a relatively large number of power utilization circuits, such for example as from eight to thirty-two or more circuits.

Each of said utilization circuits comprises a pair of conductors, one of which may be regarded as the outgoing conductor and the other as the return or ground conductor. The outgoing conductor of each of said circuits is commonly connected through an electrical protective device such as a fuse or circuit breaker to one of the incoming power conductors, such connection points being distributed along the length of a suitable power bus bar in the panel assembly.

The return wires of each of the utilization circuits, however, are all connected to a common ground or "neutral" point within the enclosure. The device used for this purpose in circuit breaker and fuse panel assemblies is known as a "neutral bar." A basic problem here is to provide means for connecting a large number of such return conductors to a common neutral conductor in as small a space as possible. For this purpose, neutral bar assemblies have been provided in accordance with the prior art comprising one or more elongated generally tubular sleeve members, each having a row of holes along the opposite sides thereof, and a row of closely spaced clamping screws threadedly engaged in the top wall thereof, for the purpose of clamping a large number of such return conductors, each inserted in one of the aforesaid holes. An assembly of the type referred to is shown in Patent No. 2,905,923, H. J. Hammerly, September 22, 1959, assigned to the same assignee as the present invention.

Such neutral bar assemblies are entirely adequate in majority of applications. With the increased use of electricity and the increased size of power utilization circuits, it has become necessary in certain cases to provide means for connecting a neutral or return conductor of at least one such power utilization circuit which is of a size which is too large to be received in the holes of such a neutral bar assembly. In such cases, it has, in the past, been necessary to provide a separate terminal block for receiving the neutral conductor of such an increased capacity utilization circuit, with attendant increased use of space and increased expense.

It is an object of the present invention to provide means for connecting a high-capacity neutral conductor to a multiple-wire connector or neutral bar of the general type described above even though the conductor is too large to be received into the wire-receiving holes of such a neutral bar.

It is a further object of the invention to provide such an adapter which includes means for shielding or insulating the connection of the large return conductor to the terminal plate portion and for physically supporting it with respect to the main neutral bar assembly.

It is a further important object of the invention to provide an adapter of the type described wherein the terminal plate portion, the clamping means, and the insulating means are all retained in assembled relation by the same means which connects the adapter to the neutral bar assembly.

In accordance with the invention in one form, an adapter is provided for use with a multiple-wire connector or neutral bar of the type described, including a connector plate having a plurality of projections, each of which is receivable in one of the wire-receiving holes of the multiple-wire connector, an integral terminal plate portion, and means for clamping a large conductor to the terminal plate portion, whereby the large return conductor is connected at a plurality of points to the neutral bar assembly.

The invention will be more fully understood from the following detailed description, and its scope will be pointed out in the appended claims.

In the drawings,

FIGURE 1 is a perspective view of a neutral bar assembly including an adapter constructed in accordance with the present invention;

FIGURE 1A is a fragmentary view of a portion of the assembly of FIGURE 1;

FIGURE 2 is an exploded perspective view of the adapter of FIGURE 1;

FIGURE 3 is an elevation view of a portion of the neutral bar assembly of FIGURE 1;

FIGURE 4 is a top plan view of a portion of the neutral bar assembly of FIGURE 1, the adapter of the present invention being shown partially in section;

FIGURE 5 is a sectional view of the connector assembly of FIGURE 1, the section being taken substantially on the center line of the adapter of the present invention;

FIGURE 6 is a semi-schematic drawing of the connector assembly of FIGURE 1, showing typical incoming and outgoing conductors.

In the drawing, the invention is shown in FIGURE 1 as incorporated in a neutral bar or multiple wire connector assembly comprising an elongated generally rectangular insulating base 10, having raised generally planar end barrier portions 11 at each end. The base 10 also includes three mounting feet 10A on each side, arranged to be slid under retaining lugs in a metallic enclosure (not shown) or otherwise clamped to hold the assembly in place. The connector assembly includes two elongated generally tubular metallic connector sleeves 12 and 13, supported thereon in a manner to be described. An elongated conductive strap 14 (see FIGURE 5) extends along the insulating base 10, within the tubular member 12 and 13, along the bottom walls thereof. The conductive strap 14 is rigidly attached to the insulating base 10 by suitable means such, for instance, as a screw (not shown) passing upwardly through the bottom wall of the insulating base 10 and into threaded engagement with the conductive strap 14.

Mounted on the conductive strap 14, by suitable means, such for example as by the screw 15A which also anchors the conductive strap 14 to the base 10, is a main incoming cable connector 15 (see FIGURE 1A). Referring to the semi-schematic drawing FIGURE 6, the connector 15 serves to connect a main neutral or ground conductor 16 to the conductive strap 14.

Each of the tubular members 12 and 13 includes a plurality of holes 17 in opposite side wall portions thereof, and a plurality of closely spaced clamping screws 18. In use, branch circuit return conductors, such as 19 (see FIGURE 6) are inserted in the holes 17 and are clamped to the conductive strap 14 by means of the screws 18.

The assembly as thus far described, is generally similar to that shown and described in the aforementioned Patent 2,905,923. It will be observed in this connection that the holes 17 in the tubular members 12 and 13 limit the size of return conductors which may be connected to the conductive plate 14.

In accordance with the invention, means is provided whereby the clamping means comprising the tubular member 13 (or 12 if desired) may receive and connect a conductor of substantially larger size than is receivable in the holes 17, to the conductive strap 14, comprising an adapter indicated generally at 20 in FIGURE 1, and shown in exploded perspective form in FIGURE 2.

Referring to FIGURE 2, the adapter of the present invention comprises a generally rectangular box-like insulating enclosure member 21, a generally rectangular tubular clamping member 22, and a generally Y-shaped or bifurcated connector plate 23.

The clamping member 22 includes a pair of generally rectangular openings 24 in opposite side wall portions thereof, and a downwardly projecting lug or tang portion 25 at one side thereof projecting slightly below the bottom wall of the clamping member. The clamping member 22 also includes a clamping screw 26 threadedly engaged in the top wall thereof and adapted to clamp a conductor such as 27, see FIGURE 6, in a manner to be described.

The connector plate 23 includes a generally planar terminal portion 30 having a sidewardly extending tang portion 31, and an offset bifurcated portion including projections 32.

The insulating housing 21 has a channel-shaped recess 33 in the bottom wall thereof to provide clearance for the tang 25 of the lug 22. The insulating housing 21 also includes opposed side walls 34, and a partial end wall 35, connecting a portion only of the side walls 34 and providing an opening 36. The side walls 34 each include a forwardly projecting portion 37 and a downwardly projecting portion 38, for a purpose to be described.

The adapter 21 is assembled in the following manner. The clamping member 22 is inserted in the housing 21, between the side walls 34 and against the bottom wall 39, with the depending tang 25 extending into the channel-shaped recess 33. The lateral dimension of the terminal portion 30, at the location of the tang 31, is greater than the distance between the corresponding side walls of the clamping member 22. The plate 23 is assembled, therefore, by tilting it and inserting it in diagonal relation through the opening 36 in the housing 21 and the aligned opening in the clamping member 22, so that the projection or tang 31 is in position to enter the opening 24A of the member 22. The plate 23 is then rotated until its main terminal portion 30 is in flatwise engagement with the bottom wall of the member 22, with the tang 31 extending into the opening 24A as shown in FIGURE 4.

With the parts in this assembled relation, the adapter assembly 20 is mounted on the neutral bar section 13 by inserting the tangs 32 in corresponding openings 17 of the member 13. In its assembled condition, as indicated in FIGURE 5, the projections 37 of the side walls 34 of the housing 21 overlie portions of the insulating base 10, and the downwardly extending projections 38 lie closely adjacent side wall portions of the insulating base 10. The clamping screws 18 are then tightened, pressing the projections 32 against the conductive plate 14.

When the parts are in this assembled condition, the adapter 20, including all parts thereof, is rigidly supported with respect to the neutral connector assembly generally. Thus for example, the connector plate 23 is rigidly supported by means of the projections 32 which are clamped to the conductor strap 14 by screws 18. The insulating housing 21 is also securely supported with respect to the insulating base 10 by reason of the fact that the terminal portion 30 of the plate 23 closely overlies the bottom wall of the clamping member 22, see FIGURE 5, which in turn closely overlies the bottom wall of the insulating housing 21, which in turn includes the projection 37 which overlies a top surface of the insulating base 10. In this connection, it will be observed that the angularly extending portion of the plate 23 which extends between the projections 32 and the terminal portion 30 provides a degree of resilience, assisting the holding action described.

The insulating housing 21 is prevented from being withdrawn in a horizontal direction by reason of the fact that the top wall 22A of the clamping member 22 abuts against the wall portion 35 of the housing 21, and by reason of the fact that the clamping member 22 is prevented from movement in the horizontal withdrawing direction because of the interlocking action of the tang 31 extending into the opening 24.

It will be observed that the rigid interconnection of all of these parts is thereby achieved by reason of the action of the screws 18 on the tang 32, regardless of whether the clamping screw 26 is in clamping position or not. The adapter 20, in its assembled relation as described, is shown in FIGURE 1 and in FIGURE 5.

In use, a return conductor of relatively large size, 27, see FIGURES 5 and 6, is inserted in the clamping member 22, and clamped thereto by the screw 26. The conductor 27 is thereby clamped against the terminal portion 30 of the plate 23, and through the plate 23, is connected to the conductive strap 14. This connection, moreover, is made at two spaced locations 32, thereby providing connection means of double the capacity of the openings 17.

The downwardly extending projections 38 of the side walls 34 of the housing 21, which lie closely adjacent the side wall of the base 10, provide additional support for the insulating housing 21 with respect to the insulating base 10, and together with the projections 37, resist relative movement of the base 21 with respect to the base 10. Such movement, for example, may tend to occur because of upward or downward movement of the conductor 27.

The housing 21 also provides an insulating shield for the connection of the conductor 27 to the plate 30, preventing accidental contact therewith by other conductors in the main enclosure.

It will be understood that the adapter 20 may be mounted at any point along the tubular member 13, or at the tubular member 12, and that more than one of such adapters may be utilized, if desired.

While the invention has been shown and described in one particular embodiment, it will be apparent that many modifications thereof may readily be made, and I therefore intend, by the appended claims, to cover all such modifications as fall within the true spirit and scope of the invention.

What I claim as new and desire to secure by Letters Patent of the United States is:

1. For use with a multiple connector assembly comprising an elongated generally tubular clamping member having a plurality of holes therein and a plurality of correspondingly positioned clamping screws adapted to connect a plurality of conductors inserted each through one of said holes and an insulating base supporting said tubular member, an adapter comprising:
 (a) a connector plate of generally planar metallic material,
 (b) said connector plate including a terminal portion,
 (c) a plurality of projections integral with said terminal portions, said projections each being adapted to be received within a corresponding hole of said tubular clamping member and to be clamped thereto by said clamping screws,
 (d) a generally box-like insulating enclosure having a bottom wall underlying said terminal portion of said connector plate, opposed side walls extending generally perpendicularly to said bottom wall in spaced relation, and a partial end wall interconnecting said side walls and providing an opening between itself and said bottom wall, (e) a generally tubular clamping member within said insulating housing between said opposed side walls and including a portion closely overlying said bottom wall of said insulating housing and a second portion abutting against said partial end wall, (f) said terminal portion including a projecting tang extending within an opening in a corresponding side wall of said clamping member, and (g) said side wall portions of said insulating enclosure including portions adapted to extend into interlocking relation with said base of said multiple connector assembly, (h) whereby relative movement between said adapter and said multiple connector assembly is substantially prevented when said projections are clamped to said tubular clamping member by said clamping screws.

2. An adapter as set forth in claim 1, wherein said interlocking means of said insulating housing of said adapter includes a first pair of projections adapted to overlie a top surface portion of said insulating base of said multiple connector assembly and a second pair of projections adapted to extend closely adjacent a side wall of said insulating base, whereby rocking movement of said adapter due to movement of a conductor connected to said adapter, is substantially prevented when said adapter is mounted on said assembly.

References Cited by the Examiner
UNITED STATES PATENTS

| | | | |
|---|---|---|---|
| 2,538,912 | 1/51 | Road et al. | 339—31 |
| 2,748,365 | 5/56 | Speck | 339—198 |
| 2,786,162 | 3/57 | Ballou | 339—198 X |
| 2,897,410 | 7/59 | Hammerly | 339—198 X |
| 2,905,923 | 9/59 | Hammerly | 339—198 |
| 2,942,157 | 6/60 | Davis | 339—198 X |
| 2,943,294 | 6/60 | Norden | 339—198 |
| 3,012,220 | 12/61 | Fox | 339—176 |

JOSEPH D. SEERS, *Primary Examiner.*

ALFRED S. TRASK, *Examiner.*